United States Patent [19]
Buckethal et al.

[11] 4,118,553
[45] Oct. 3, 1978

[54] COMPOSITE BATTERY PLATE GRID AND METHOD OF MANUFACTURING

[75] Inventors: Paul J. Buckethal, Villa Hills, Ky.; Jerome J. Groff, Wauwatosa, Wis.; Vincent M. Halsall, River Hills, Wis.; Roy E. Hennen, Mequon, Wis.

[73] Assignee: Globe-Union, Inc., Milwaukee, Wis.

[21] Appl. No.: 806,927

[22] Filed: Jun. 15, 1977

Related U.S. Application Data

[63] Continuation-in-part of Ser. No. 687,166, May 17, 1976, abandoned.

[51] Int. Cl.² .............................................. H01M 4/72
[52] U.S. Cl. .................................... 429/234; 429/241; 429/245; 264/219
[58] Field of Search ............... 429/234, 241, 245, 233; 264/219, 225, 239–241, 250, 319, 104

[56] References Cited

U.S. PATENT DOCUMENTS

| | | | |
|---|---|---|---|
| 3,083,250 | 3/1963 | Geissbauer | 429/241 |
| 3,516,863 | 6/1970 | Willmann et al. | 429/211 |
| 3,516,864 | 6/1970 | Willmann et al. | 429/211 |
| 3,532,545 | 10/1970 | Babusei et al. | 429/241 |
| 3,556,854 | 1/1971 | Wheadon et al. | 429/228 |
| 3,607,412 | 9/1971 | Holloway | 264/104 |
| 3,652,336 | 3/1972 | Wheadon et al. | 29/623.4 |
| 3,679,789 | 7/1972 | Wheadon et al. | 264/249 |
| 3,690,950 | 9/1972 | Wheadon et al. | 429/234 |
| 3,738,871 | 6/1973 | Scholle | 429/234 |
| 3,772,084 | 11/1973 | Scholle | 141/1.1 |
| 3,808,054 | 4/1974 | Wheadon et al. | 429/211 |
| 3,813,300 | 5/1974 | Shima et al. | 429/243 |
| 3,901,960 | 8/1975 | Holloway et al. | 264/104 |
| 3,926,674 | 12/1975 | Jonville et al. | 264/104 |
| 3,956,012 | 5/1976 | Scholle | 429/234 |

FOREIGN PATENT DOCUMENTS

| | | |
|---|---|---|
| 269,245 | 3/1969 | Austria. |
| 2,058,705 | 11/1970 | Fed. Rep. of Germany. |
| 1,007,497 | 10/1965 | United Kingdom. |
| 1,240,672 | 7/1971 | United Kingdom. |

*Primary Examiner*—Charles F. LeFevour
*Attorney, Agent, or Firm*—Neuman, Williams, Anderson & Olson

[57] ABSTRACT

A composite battery plate grid comprising a plastic support molded to engage portions of a metallic conductive member. Using first and second mold halves, the conductive member is cast in a first pattern in the first and/or second mold halves. The plastic support is then injection molded in a second pattern in the first and/or second mold halves. In the alternative, after casting the conductive member in the first pattern, the second mold half is replaced by a third mold half with the conductive member remaining in the first mold half, and the plastic support is injection molded in a second pattern in the first and/or third mold halves. In all cases, during injection molding, the plastic material is caused to flow at selected portions of the conductive member, where, upon solidifying, the plastic support engages portions of the conductive member.

36 Claims, 20 Drawing Figures

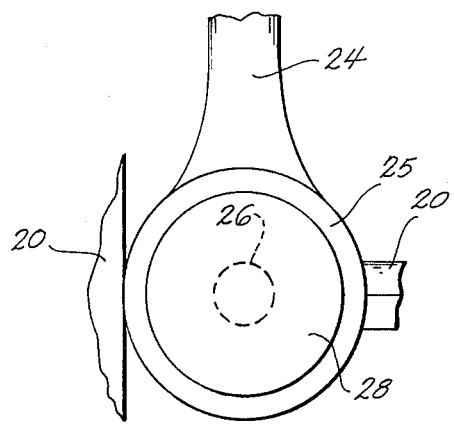
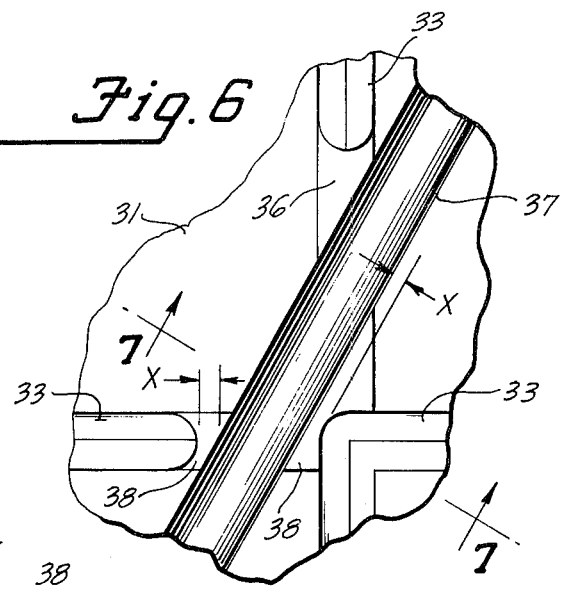
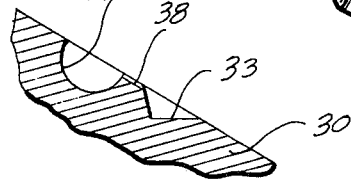
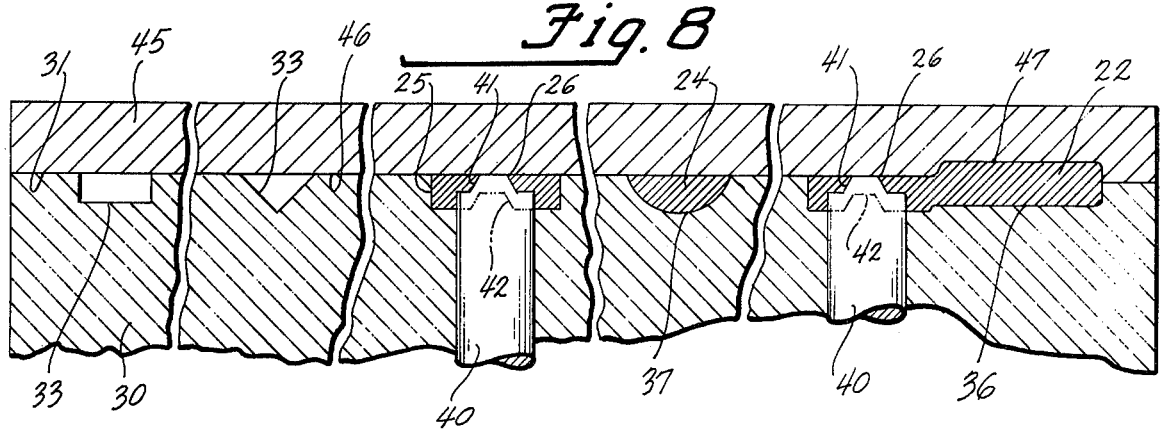
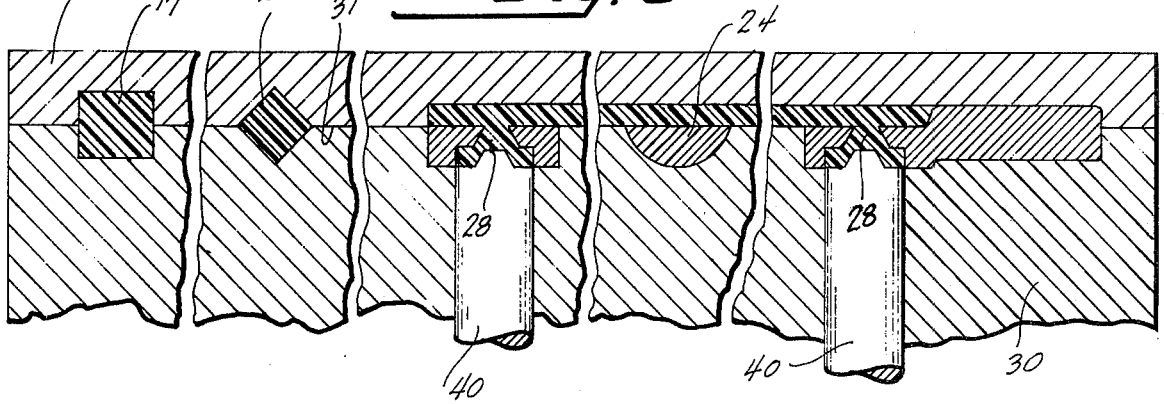

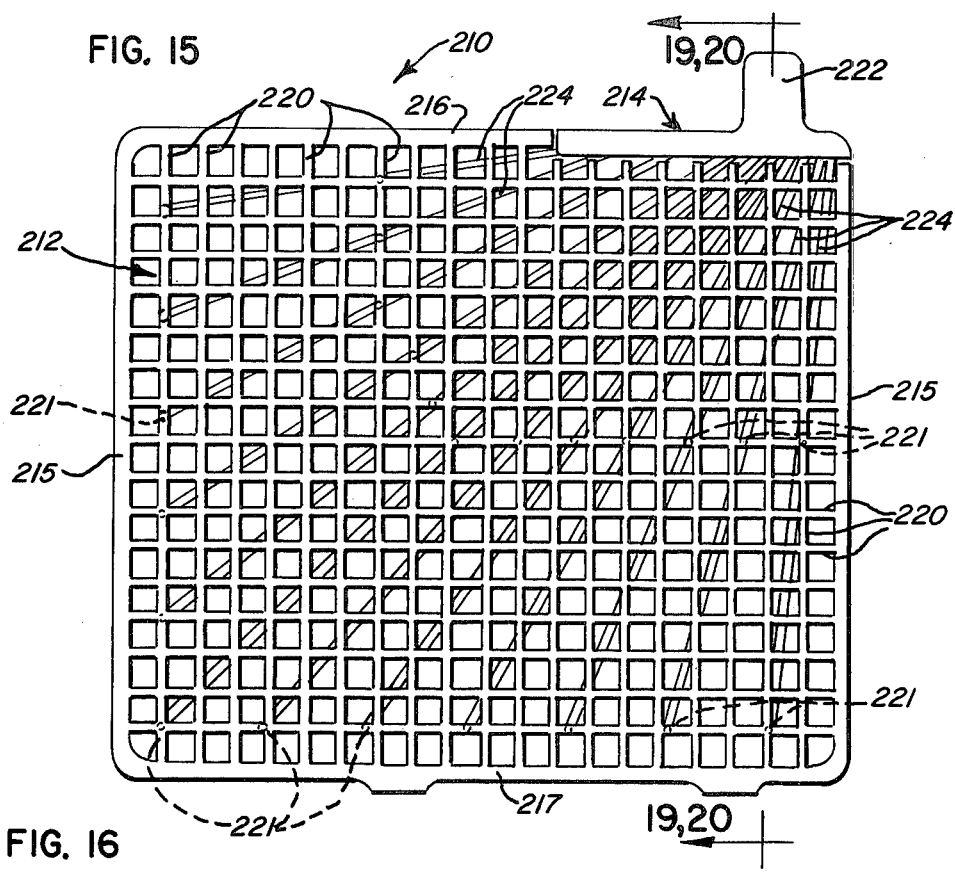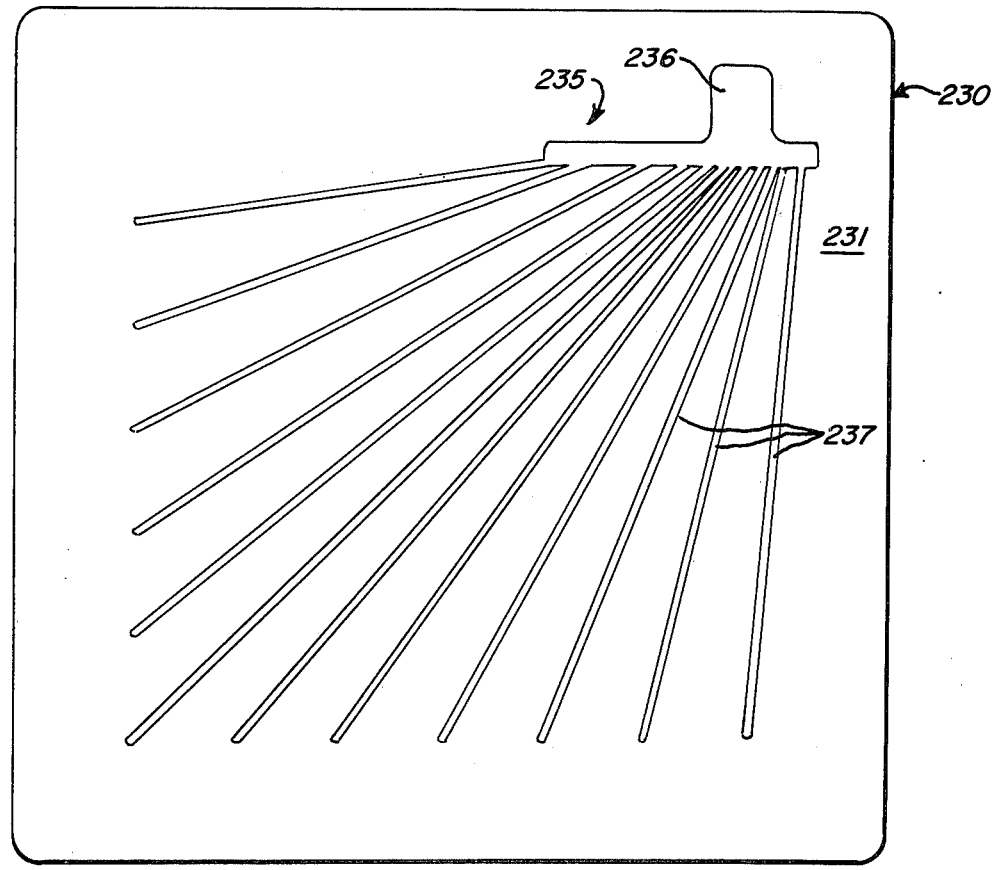

COMPOSITE BATTERY PLATE GRID AND METHOD OF MANUFACTURING

BACKGROUND OF THE INVENTION

This application is a continuation-in-part application of application Ser. No. 687,166 filed on May 17, 1976, by the same applicants and now abandoned.

This invention primarily relates to battery plate grids for secondary storage batteries and in particular relates to battery plate grids for lead-acid batteries. The invention may also find application in non-battery uses.

Conventional lead-acid storage batteries comprise a plurality of alternating positive and negative battery plates which are stacked with interspersed nonconductive separators to form battery elements. The battery elements are mounted in one or more individual cells of a storage battery case and electrically interconnected as is well known in the art. Conventionally, each positive and negative plate comprises a supporting conductive grid structure which is normally made of lead or a lead alloy and which supports an electrochemically active paste material. The lead grids serve the dual purpose of supporting the paste material as well as acting as electrical current conductors.

Over the years, the battery industry has endeavored to reduce the amount of lead utilized in batteries. A reduction in the amount of lead used not only reduces the weight of a battery but may also result in a material cost savings as well. Battery grids represent a potentially fruitful area of material reduction since conventional lead grids include much more material than is needed for the function of collecting and conducting electrical current. Reduction of the amount of grid material has been limited, however, since the grids also serve as physical supports for the paste material and limitations on the ability to handle the pasted plates prior to combination into elements and installation in a storage battery have hampered efforts to reduce the grid thickness or the amount of lead utilized.

One particularly desirable method of reducing the amount of lead in battery grids lies in the area of combining less expensive, lightweight materials such as plastics with the lead. Plastics are a particularly desirable class of materials since many types are available which are relatively insoluble in acid, are lightweight, yet strong enough to serve as supporting grid structures, and offer a reduction in cost as compared with lead. Accordingly, many efforts have been directed toward forming composite plastic-lead battery grids. Prior art efforts in this regard have centered on two basic approaches. The first approach has been to utilize plastic alone to form the supporting grid structure. For example, U.S. Pat. No. 3,813,300, issued May 28, 1974 to Shunji Shima et al., shows a plastic grid in which the active paste material conducts electricity to a separately formed and attached conductive current collector. Similarly, U.S. Pat. Nos. 3,516,863 and 3,516,864, both issued June 23, 1970 to Willmann, and British Pat. No. 1,240,672, published July 28, 1971, show plastic grids having lugs mechanically attached. The plastic grids may be coated with a conductive material. Finally, U.S. Pat. Nos. 3,901,960, issued Aug. 26, 1975, and 3,607,412, issued Sept. 21, 1971, both to Holloway, show grids produced by placing a separately formed conductive lug in a mold and molding a plastic resin grid onto the lug.

These prior art techniques have several major disadvantages. All involve separate handling of conductive lugs and plastic grids. In Shunji Shima, the active material has low efficiency as a current conductor and collector, and loss of active material around the lug could render the plate useless. Basically, in all cases, the savings in material costs and weight reduction would be offset by increased production costs as compared to conventional lead grid casting.

The second major approach to composite grid manufacture has been to combine lead and plastic to form a supporting grid structure. U.S. Pat. No. 3,690,950, issued Sept. 12, 1972 to Wheadon, shows a composite grid in which lead wires are heated and fused with a plastic grid. Austrian Pat. No. 269,245, issued Mar. 10, 1969, shows molding of plastic around preformed lead wires placed in a mold, and British Pat. No. 1,007,497, published Oct. 13, 1965, shows mechanical assembly of lead and plastic portions to form a battery grid.

While the second approach offers improved current carrying capabilities due to the use of lead wires, all prior art attempts again require separate handling of lead and plastic stages of assembly. None of these techniques permit formation of a composite grid at a single station with minimal handling prior to complete fabrication.

SUMMARY OF THE INVENTION

It is an object of the invention to provide a composite article of manufacture which is easily mass producible.

Another object of the present invention is to provide a lightweight battery plate grid for storage batteries.

A further object of the invention is to provide a composite battery plate grid which is easily manufactured on a mass production basis.

A still further object of the invention is to provide a method of producing a composite article by mass production techniques.

Other objects and advantages of the present invention will be apparent from a description of the preferred embodiments which follows.

The invention basically comprises a composite article in which a flowable material is molded to engage or to form interlocking joints with portions of a first material. The article is produced in a mold comprising first and second mold cavities in which the first material pattern is molded. Movable means are provided which are extended within the first and second mold halves to form a plurality of voids in communication with the first material. After molding and solidifying the first material, the second mold half is withdrawn with the molded first material being retained in the first mold half, and a third mold half is moved into engagement with the first mold half for injection of the flowable material which flows into the voids formed in communication with the first material to form a plurality of integrally molded interlocking joints with portions of the molded first material.

Alternatively, such composite article is produced by a method in which only two mold halves are employed which have first and second patterns formed therein. The second pattern overlies portions of the first pattern. Movable means are provided which are movable between a first position and a second position. Such movable means, in their first position, are in communication with the first pattern at selected places where said second pattern overlies said first pattern; and at least one type of such movable means, in their first position, serves to separate the first and second patterns everywhere said second pattern overlies said first pattern. After molding and solidifying the first material in the first pattern, the movable means are positioned to create voids in communication with the first and second patterns and to remove the separation between the first and second patterns where the second pattern overlies the first pattern. Then the flowable material is injected into the second pattern and into the voids and is allowed to solidify to engage portions of the first material.

Alternatively, such composite article is produced by a method in which no movable means are employed. A first pattern is located in each of the first and second mold halves. After molding and solidifying the first material in the first pattern, the second mold half is withdrawn with the molded first material being retained in the first mold half. A third mold half is moved into engagement with the first mold half for injection of the flowable material. The third mold half has a second pattern formed therein into which extends a portion of the first material which was molded in the portion of the first pattern in the second mold half. The flowable material is injected into the second pattern and flows around the portion of the molded first material which extends into the second pattern and is allowed to solidify to engage portions of the first material.

DESCRIPTION OF THE DRAWINGS

FIG. 5 is a detailed view of the portion of FIG. 1 encircled by line 5—5;

FIG. 6 is a detailed view of the portion of FIG. 2 encircled by line 6—6;

FIG. 7 is a view along line 7—7 of FIG. 6;

FIG. 8 is a sectional view of the portion of the first and second mold halves taken along line 8—8 of FIG. 1;

FIG. 9 is a sectional view similar to FIG. 8 of the first and third mold halves;

FIG. 15 shows a third embodiment of a battery plate grid according to the present invention;

FIG. 16 is a top view of a first mold half for forming the battery plate grid of FIG. 15;

DESCRIPTION OF THE PREFERRED EMBODIMENTS

Figure 1:
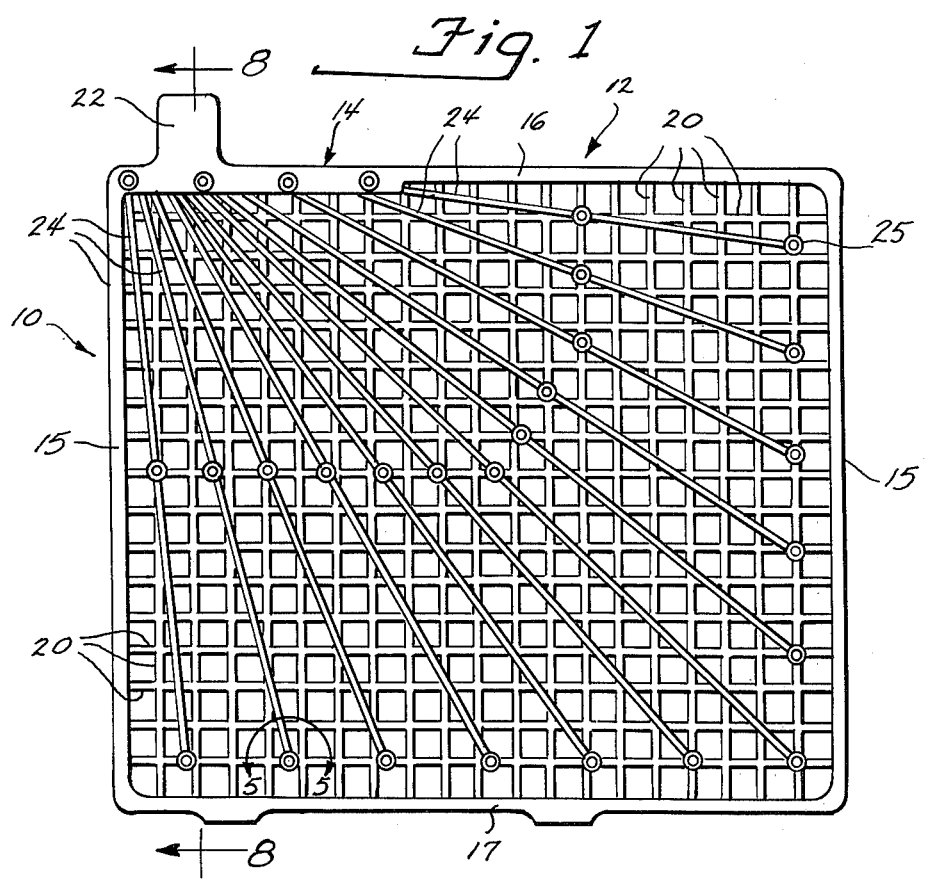
FIG. 1 shows one embodiment of a battery plate grid according to the present invention.

With reference to FIGS. 1 and 5, one embodiment of a battery plate grid 10 according to the invention comprises a molded supporting grid 12 to which a fan-like conductive member 14 is attached. The molded supporting grid 12 comprises peripheral sides 15 and top and bottom members 16 and 17, respectively, defining a generally rectangular boundary. Within the sides 15 and top and bottom members 16 and 17 are a plurality of interconnected spaced runners 20. Superimposed upon the supporting grid 12 is the fan-like conductive member 14 comprising a terminal lug 22 having a plurality of divergent conductive runners 24 extending therefrom. The conductive runners 24 each have at least one generally disc-shaped portion 25 formed therein, each of which has a central aperture 26 formed therein. The disc-shaped portions 25 are located at points where the conductive runners 24 intersect molded runners 20 and are mechanically locked to the supporting grid 12 at the intersection points by molded material extending from the runners 20 through the apertures 26 to form generally circular retaining heads 28. In the preferred embodiment, a conductive grid 14 is formed of lead or a lead alloy and the molded supporting grid is formed from a suitable acid resistant moldable plastic material such as polypropylene, polyethylene, polycarbonate, polystyrene, or filled versions of the same.

Figure 2:
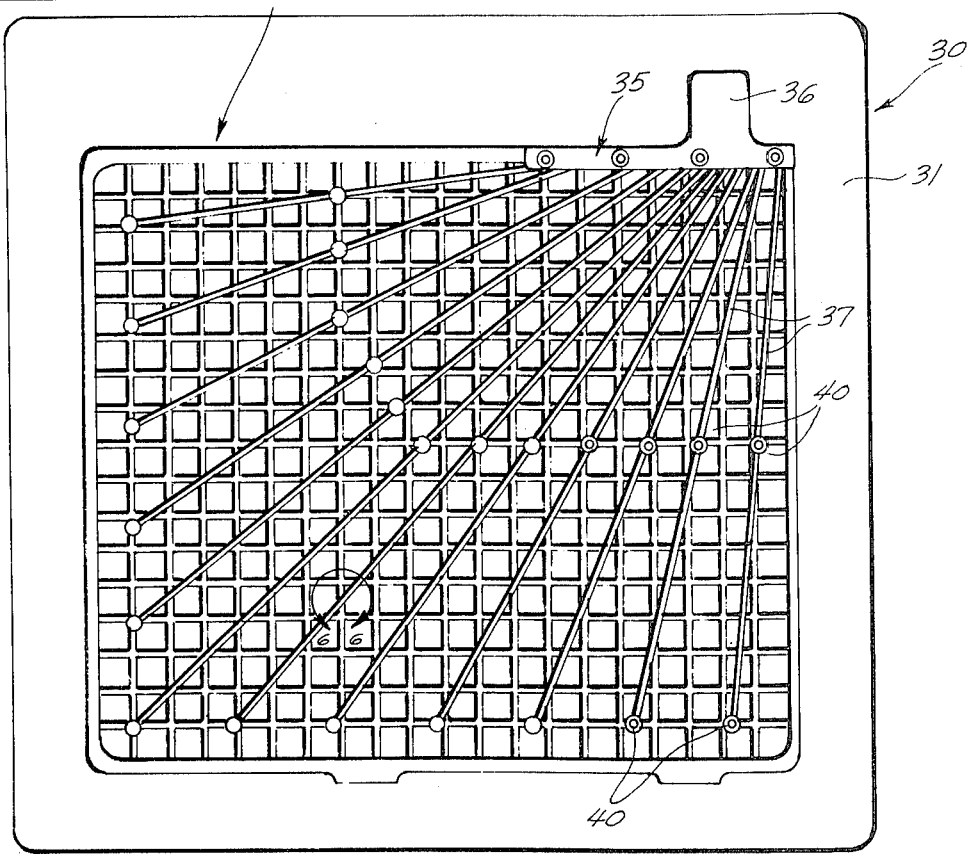
FIG. 2 is a top view of a first mold half for forming the battery plate grid of FIG. 1.
Figure 3:
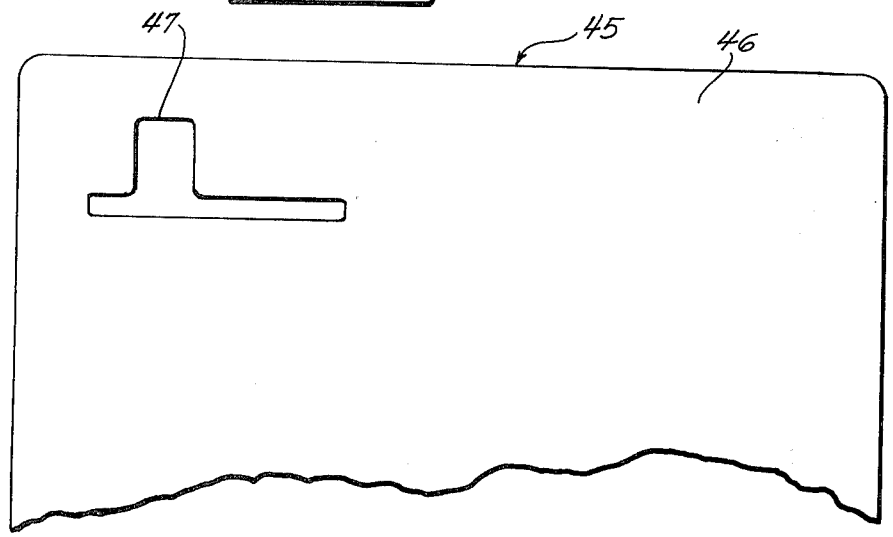
FIG. 3 is a top view of a second mold half for forming the battery plate grid of FIG. 1.
Figure 4:
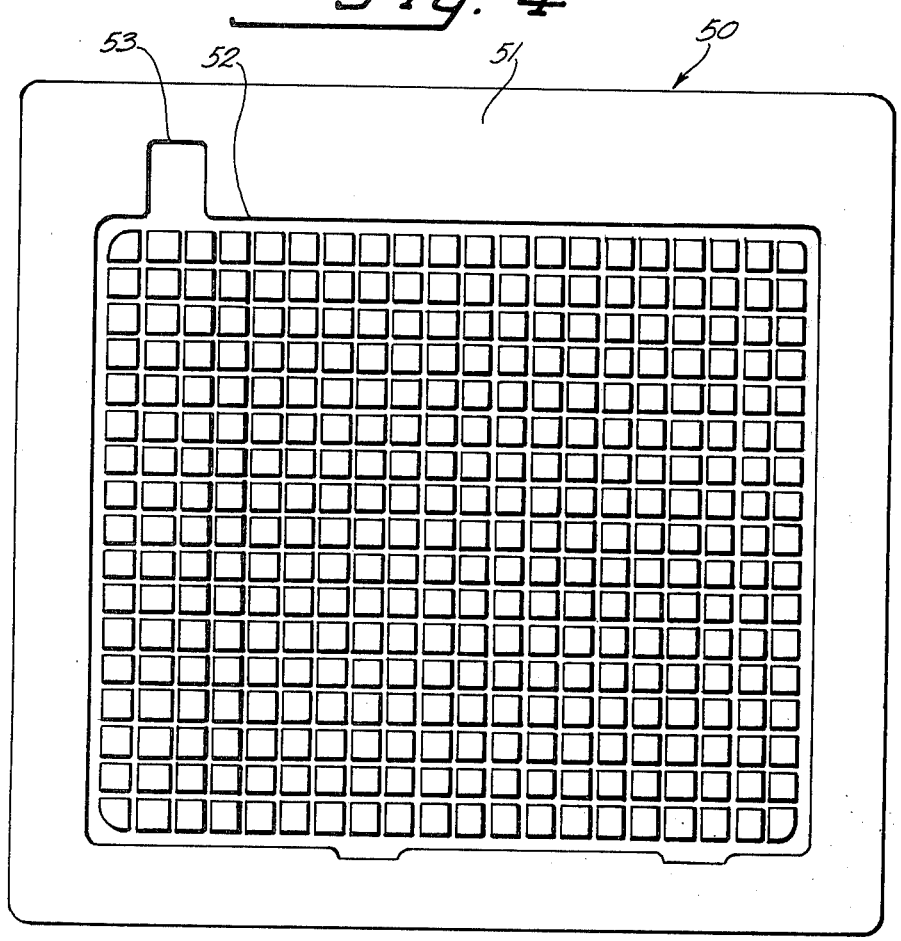
FIG. 4 is a top view of a third mold half for forming the battery plate grid of FIG. 1.

Manufacture of the grid 10 is effected through the use of three mold halves shown in FIGS. 2 through 4. With reference to FIG. 2, the first mold half 30 is shown which has a planar top surface 31. A first mold pattern 33 is formed therein conforming to the shape of the desired plastic supporting grid 12, and a second pattern 35 which defines the conductive member 14 including an area 36 conforming to the lug portion 22 and divergent finger portions 37 which define the conductive runners 24. It will be seen that the portions 37 are contiguous with the area 36 and the points where the portions 37 intersect the nonconductive grid pattern 33 are separated from the nonconductive forming cavities. This is best illustrated in FIG. 6 which is a view on an enlarged scale of an intersection point. It has been found that the preferred distance "X" between the portions 37 and the corresponding portions of network 33 should be approximately 0.010 inch (0.025 cm.). However, interconnecting passageways 38 of approximately 0.002 inch (0.005 cm.) depth are provided between the lead and plastic grooves 37 and 33, respectively. This depth prevents lead flow from the finger portions 37 into the network 33 while at the same time permitting venting of air during the lead injection phase as will be described hereinafter.

Referring now to FIGS. 2 and 8, it will be seen that the mold half 30 includes a plurality of pins 40 which are movable in a direction perpendicular to the planar top surface 31. The pins 40 are placed at desired connection points between the lead runners 24 and the plastic grid runners 20 and thus are located at selected intersections between the lead runner grooves 37 and the nonconductive grid defining portions 33. The end portions of the pins 40 are provided with a generally frusto conical upraised portion 41 which is of reduced diameter from the diameter of pins 40. The end of the frusto conical portion 41 is coplanar with plane 31 when the pin is in an extended position and is movable to a point indicated by phantom lines 42 in FIG. 8 when the pins 40 are retracted.

As shown in FIG. 3, a second mold half 45 is provided which has a generally planar top surface 46 in which is formed a mold cavity 47 which generally defines one-half of the lug portion 22 of the conductive grid 14. Similarly, as seen in FIG. 4, a third mold half 50 is provided which has a generally planar top surface 51 and a mold pattern 52 in the shape of the plastic supporting grid 12, plus a clearance area 53 to accommodate the lug portion 22.

FIGS. 8 and 9 show a cross-sectional view of a portion of mold halves 30 and 45 and 50 for forming a grid 10 according to this embodiment of the invention. As seen in FIG. 8, initially the first and second mold halves 30 and 45 are brought together with pins 40 extended against planar surface 46. Lead is injected under pressure or fed by gravity into the mold cavities to form the lug portion 22, lead runners 24 and the disc portions 25 having the apertures 26 formed therein. The lead injection point and gating may be provided by conventional techniques. Referring to FIG. 9, after the lead portion has been cast and solidified, the second mold half 45 is removed while retaining the lead in the first mold half, and the third mold half 50 brought into contact with the first mold half 30 and the pins 40 are retracted. The plastic is then injected in both mold patterns to form the grid portions including the bottom member 17 and runners 20 as shown in FIG. 7. Additionally, the plastic will pass through the apertures 26 formed in the lead disc portions 25 to form disc-like heads 28 which lock the lead disc portions 25 to the supporting grid 12. Again, conventional injection and gating may be provided. After solidification of the plastic, the mold halves 50 and 30 may be separated and the grid 10 ejected in a conventional manner.

Figure 10:
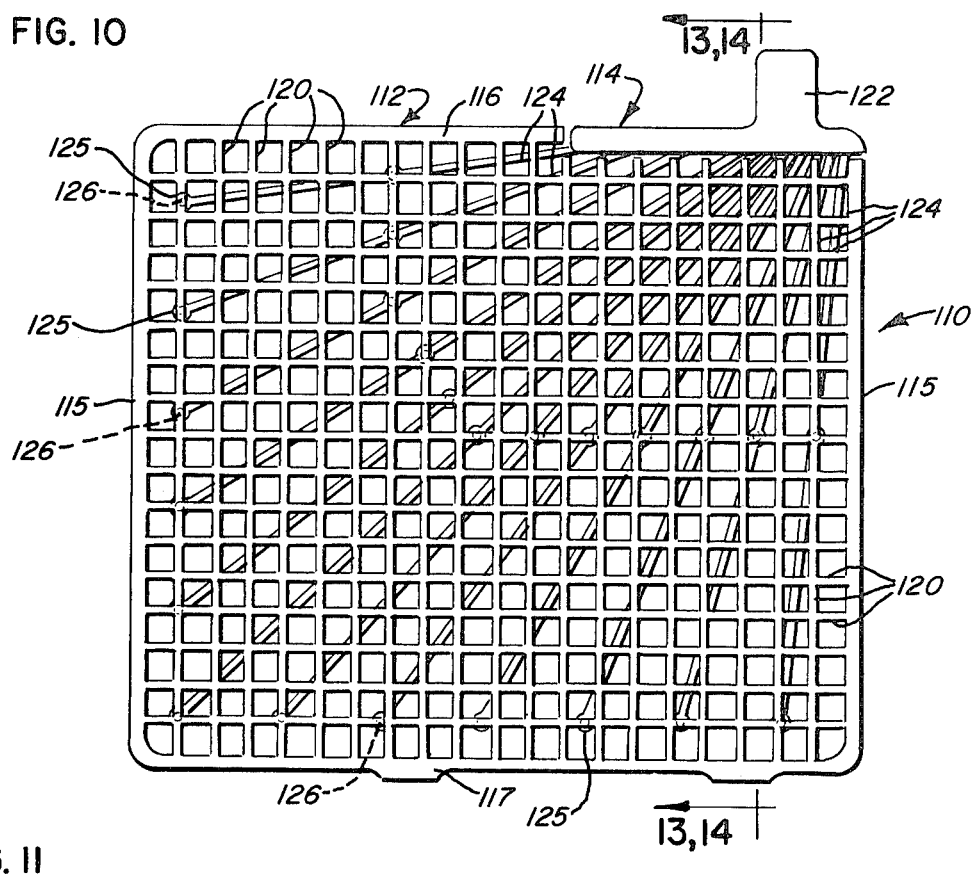
FIG. 10 shows a second embodiment of a battery plate grid according to the present invention.

Grid 110 is another embodiment of the composite grid of this invention and is shown in FIG. 10. Manufacture of the grid 110 can be effected through the use of only two mold halves shown in FIGS. 11-14. With reference to FIGS. 10, 13 and 14, the battery plate grid 110, according to this embodiment of the invention, comprises a molded supporting grid 112 to which a fan-like conductive member 114 is attached. The molded supporting grid 112 comprises peripheral sides 115 and top and bottom members 116 and 117, respectively, defining a generally rectangular boundary. Within the sides 115 and top and bottom members 116 and 117, respectively, are a plurality of interconnected spaced runners 120. Attached to the supporting grid 112 is the fan-like conductive member 114 comprising a terminal lug 122 having a plurality of divergent conductive runners 124 extending therefrom. Each of the conductive runners 124 has at least one generally disc-shaped portion 125 formed therein, each of which has a central aperture 126 formed therein. The disc-shaped portions 125 are located at points where the molded runners 120 overlie the conductive runners 124 and are mechanically locked to the supporting grid 112 at such points by molded material extending from the runners 120 through the apertures 126 to form generally circular retaining heads 128. In the preferred embodiment, the conductive grid 114 is formed of lead or a lead alloy, and the molded supporting grid 112 is formed from a suitable acid resistant moldable plastic material such as polypropylene, polyethylene, polycarbonate, polystyrene, or filled versions of the same.

Figure 11:
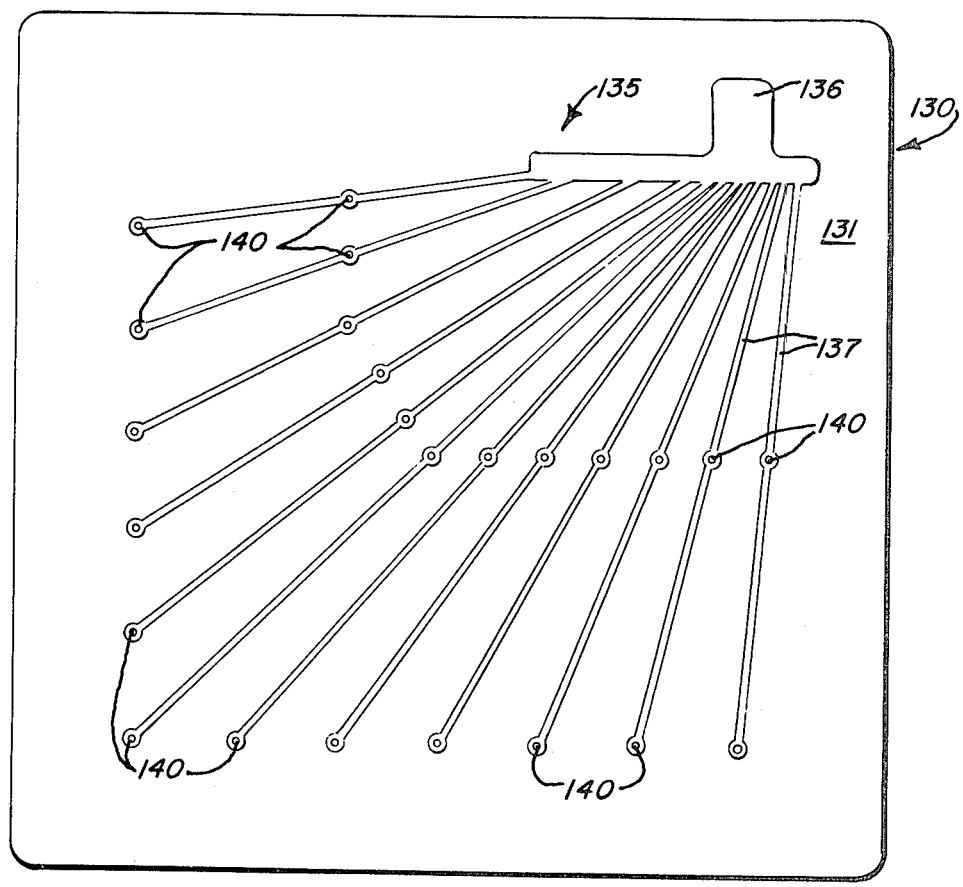
FIG. 11 is a top view of a first mold half for forming the battery plate grid of FIG. 10.

With reference to FIG. 11, the first mold half 130 is shown which has a planar top surface 131. A first pattern 135 defines the conductive member 114 including the portion 136 which conforms to the lug portion 122 and divergent finger portions 137 which define the conductive runners 124 including the disc-shaped portions 125 formed therein.

Referring now to FIGS. 11, 12, 13 and 14, it will be seen that the mold half 130 includes a plurality of a first type of retractable pins 140 which are movable in a direction perpendicular to the planar top surface 131. The pins 140 are placed at desired connection points between the lead runners 124 and plastic grid runners 120 and thus are located at selected points where portions of a nonconductive grid defining pattern 152 overlie the lead runner grooves 137. The end portions of the pins 140 are provided with a generally frustoconical upraised portion 141 which is of reduced diameter from the diameter of the pins 140. The generally planar end surface 143 of the frustoconical portion 141 is coplanar with the plane 131 when the pin 140 is in an extended position and is movable to a point indicated by the phantom lines 142 in FIG. 13 when the pins 140 are retracted.

Figure 12:
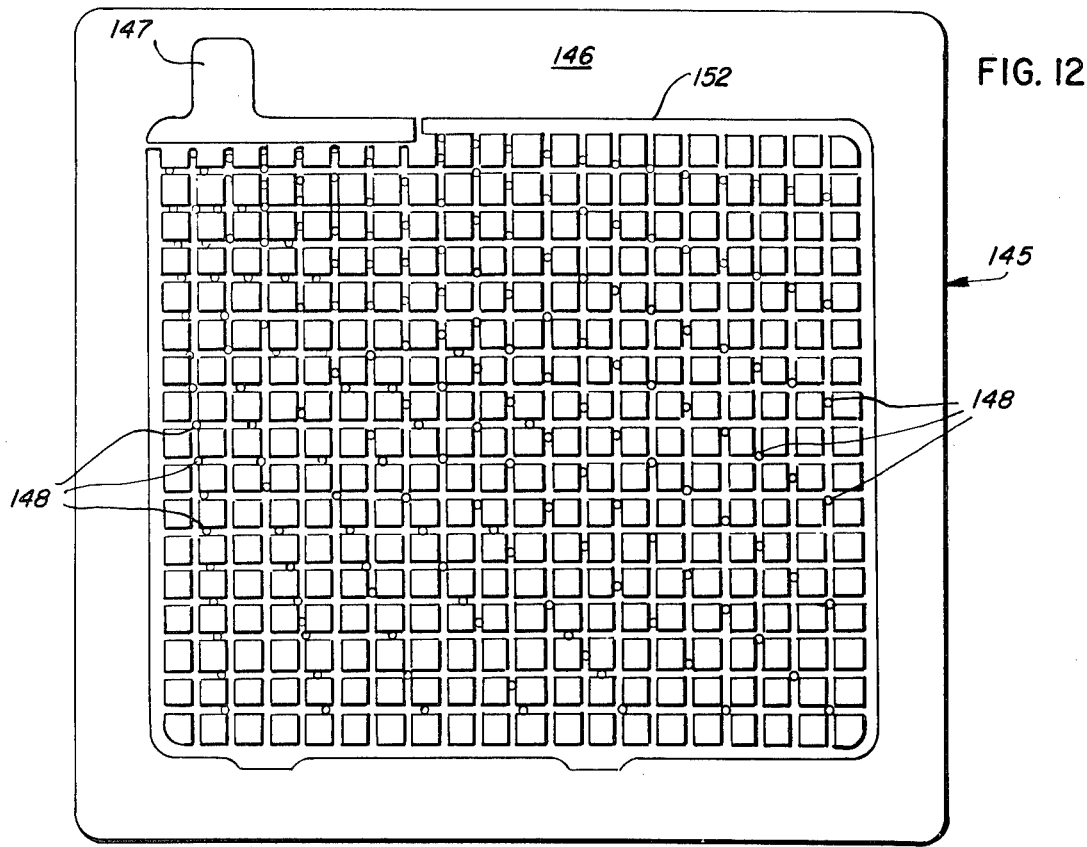
FIG. 12 is a top view of a second mold half for forming the battery plate grid of FIG. 10.
Figure 13:
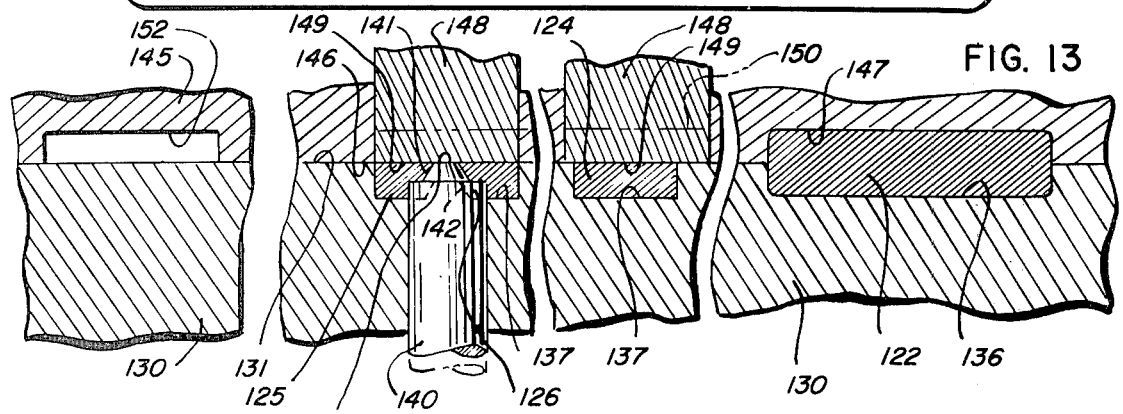
FIG. 13 is a sectional view of the portion of the first and second mold halves taken along line 13—13 of FIG. 10 with two types of movable means in their first positions.
Figure 14:
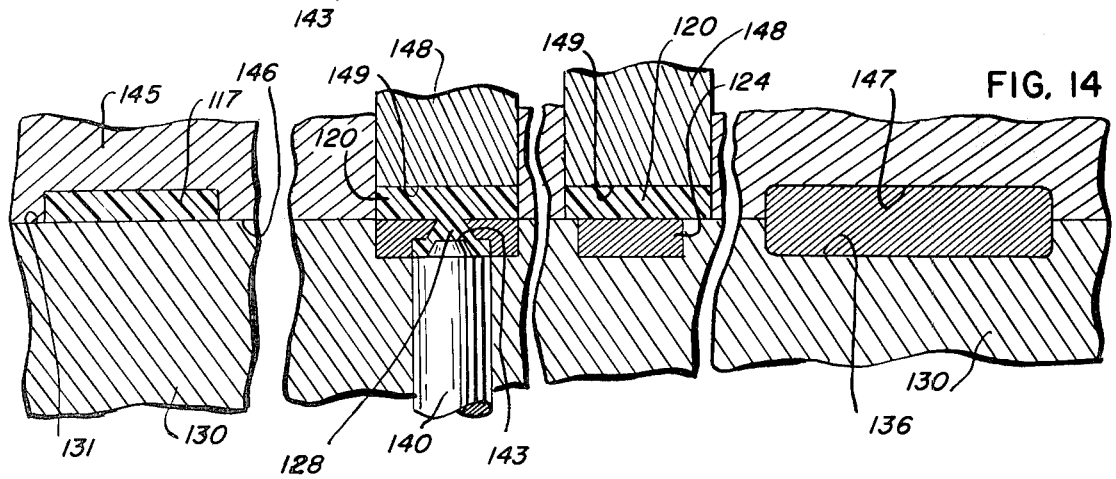
FIG. 14 is a sectional view of the portion of the first and second mold halves taken along line 14—14 of FIG. 10 and corresponds to FIG. 13, except with the two types of movable means being in their second positions and plastic also being molded.

As shown in FIGS. 12 and 13, a second mold half 145 is provided which has a generally planar top surface 146 in which is formed a mold cavity 147 which generally defines one-half of the lug portion 122 of the conductive grid 114. The second mold half 145 also is provided with a second mold pattern 152 in the shape of the plastic supporting grid 112. The mold cavity 147 and second mold pattern 152 are separated so that lead injected into the mold cavity 147 does not enter the second mold pattern 152. The second mold half 145 also is provided with a second type of retractable pins 148 which are movable in a direction perpendicular to the planar top surface 146. The pins 148 are placed at the above-mentioned desired connection points — that is, where the nonconductive grid defining portions 152 overlie the lead runner grooves 137 and opposite from the retractable pins 140 — as well as at all other points where the nonconductive grid defining portions 152 overlie the lead runner grooves 137. The pins 148 are provided with a generally planar end surface 149. The end surface 149 is coplanar with the plane 146 when the pin 148 is in an extended position and is movable to a point indicated by phantom lines 150 in FIG. 12 when the pins 148 are retracted.

FIGS. 13 and 14 show a cross-sectional view of a portion of the mold halves 130 and 145 for forming a grid 110 according to this embodiment of the invention. As seen in FIG. 13, initially the first and second mold halves 130 and 145, respectively, are brought together with the retractable pins 140 and 148 in their extended positions. In their extended positions, both types of the pins 140 and 148 are in communication with the first pattern 135, and the pins 148 prevent entry of lead into the second mold pattern 152. Lead is injected under pressure or fed by gravity into the mold cavities to form the lug portion 122 and the lead runners 124 including the disc portions 125 having the apertures 126 formed therein. The lead injection point and gating may be provided by conventional techniques.

Referring to FIG. 14, after the lead portion has been cast and solidified, the pins 140 and 148 are retracted. Retraction of the pins 140 and 148 produces the voids 126 which are in communication with both the first and second patterns 135 and 152, respectively, and retraction of the pins 148 also removes the separation between the first and second patterns 135 and 152, respectively, and permits plastic to flow into the voids 126. The plastic is then injected to form the grid portions including the bottom member 117 and runners 120. Additionally, the plastic will pass through the apertures 126 formed in the lead disc portions 125 to form the disc-like heads 128 which lock the lead disc portions 125 to the supporting grid 112. Again, conventional injection and gating may be provided. After solidification of the plastic, the mold halves 130 and 145 may be separated and the grid 110 ejected in a conventional manner.

Figure 19:
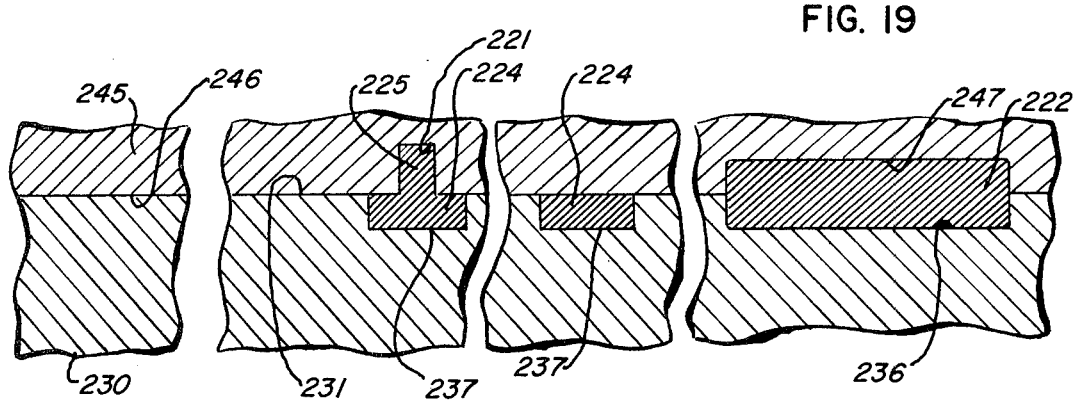
FIG. 19 is a sectional view of the portion of the first and second mold halves taken along line 19—19 of FIG. 15.
Figure 20:
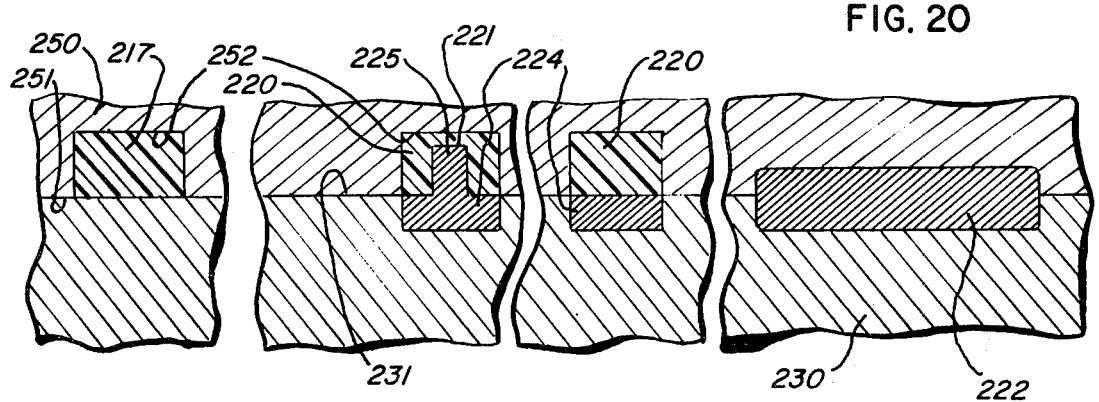
FIG. 20 is a sectional view of the portion of the first and third mold halves taken along line 20—20 of FIG. 15 and corresponds to FIG. 19, except for the third mold half replacing the second mold half and plastic also being molded.

Grid 210 is another embodiment of the composite grid of this invention and is shown in FIG. 15. With reference to FIGS. 15, 19 and 20, a battery grid 210 according to this embodiment of the invention comprises a molded supporting grid 212 with which a fan-like conductive member 214 is in engagement. The molded supporting grid 212 comprises peripheral sides 215 and top and bottom members 216 and 217, respectively, defining a generally rectangular boundary. Within the sides 215 and top and bottom members 216 and 217, respectively, are a plurality of interconnected spaced runners 220, having generally cyclindrically shaped cavities 221 which are formed in the surface thereof. In engagement with the supporting grid 212 is the fan-like conductive member 214 comprising a terminal lug 222 having a plurality of divergent conductive runners 224 extending therefrom. Each of the conductive runners 224 has at least one generally cylindrically shaped rod 225 integrally formed thereon and extending laterally therefrom and into the generally cylindrically shaped cavities 221 formed in the conductive runners 224. The cyclindrically shaped rods 225 and cylindrically shaped cavities 221 are so located and formed that each of the rods 225 fits into a hollow cavity 221 and is engaged and supported therein by the molded material of the supporting grid 212. In the preferred embodiment, a conductive grid 214 is formed of lead or a lead alloy, and the molded supporting grid is formed from a suitable acid resistant moldable plastic material such as polypropylene, polyethylene, polycarbonate, polystyrene, or filled versions of the same.

Figure 17:
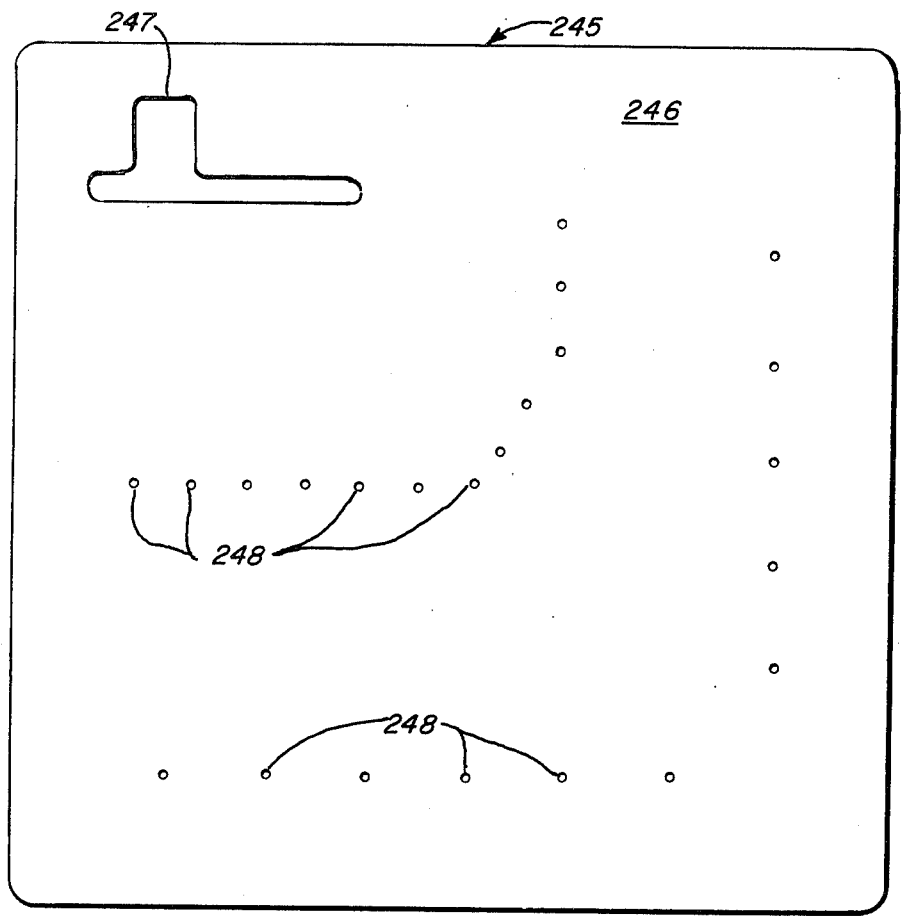
FIG. 17 is a top view of a second mold half for forming the battery plate grid of FIG. 15.
Figure 18:
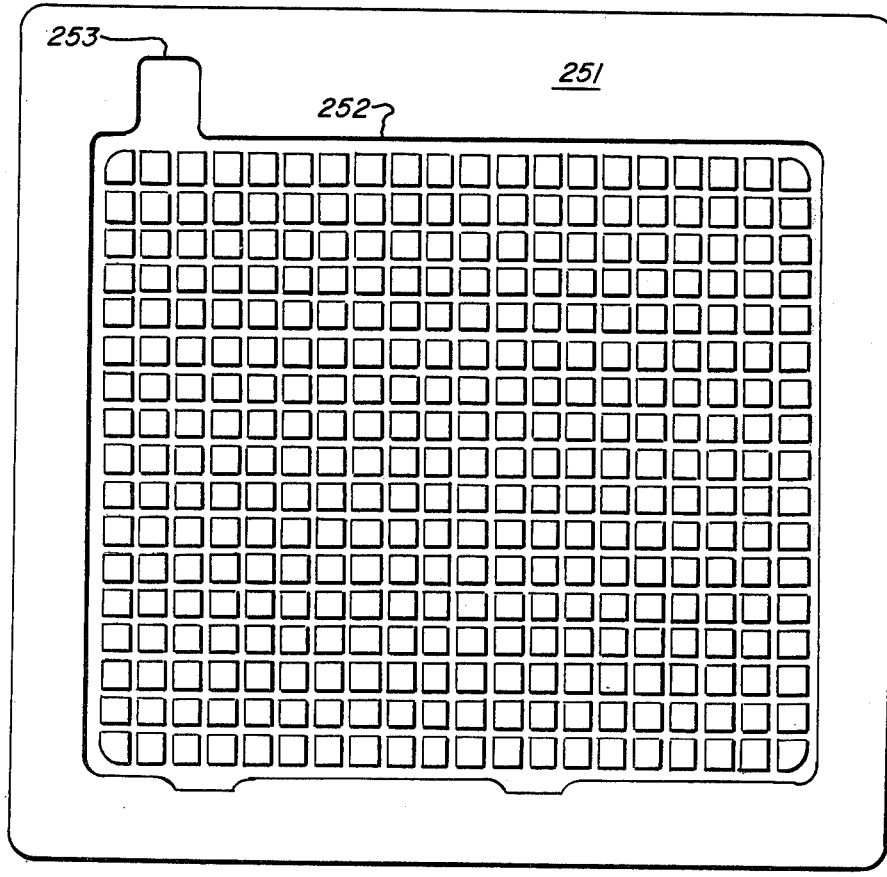
FIG. 18 is a top view of a third mold half for forming the battery plate grid of FIG. 15.

Manufacture of the grid 210 is effected through the use of three mold halves shown in FIGS. 16 through 18. With reference to FIG. 16, the first mold half 230 is shown which has a planar top surface 231. A pattern 235 includes an area 236 conforming to the lug portion 222 and divergent finger portions 237 which define the conductive runners 224.

As shown in FIGS. 17 and 19, a second mold half 245 is provided which has a generally planar top surface 246 in which is formed a mold cavity 247 which generally defines one-half of the lug portion 222 of the conductive grid 214 and mold cavities 248 which define the generally cylindrically shaped rods 225 formed in the conductive runners 224. The mold cavities 248 are located at desired connection points between the lead runners 224 and plastic grid runners 220 and thus are located where portions of the nonconductive grid defining pattern 252 overlie the lead runner grooves 237.

Similarly, as seen in FIG. 18, a third mold half 250 is provided which has a generally planar top surface 251 and a mold pattern 252 in the shape of the plastic supporting grid 212, plus a clearance area 253 to accommodate the lug portion 222.

FIGS. 19 and 20 show a cross-sectional view of a portion of mold halves 230 and 245 and 250 for forming a grid 210 according to this embodiment of the invention. As seen in FIG. 19, initially the first and second mold halves 230 and 245, respectively, are brought together so that each of the cavities 248 is in communication with a lead runner groove 237. Lead is injected under pressure or fed by gravity into the mold cavities to form the lug portion 222, lead runners 224 and the rods 225. The lead injection point and gating may be provided by conventional techniques. Referring to FIG. 20, after the lead portion has been cast and solidified, the second mold half 245 is removed while retaining the lead in the first mold half 230, and the third mold half 250 is brought into contact with the first mold half 230 so that the rods 225 extend into the mold pattern 252. The plastic is then injected to form the grid portions including the bottom member 217 and runners 220. Additionally, the plastic will pass around the perimeter of each of the rods 225 to form the cavities 221. Upon solidification of the plastic, the rods 225 fit snugly into the cavities 221 and are engaged and supported therein by the molded plastic supporting grid 212. Again, conventional injection and gating may be provided. After solidification of the plastic, the mold halves 250 and 230 may be separated and the grid 210 ejected in a conventional manner.

While the present invention has been described as applied to the manufacture of a composite battery grid for a lead acid storage battery, those skilled in the art will appreciate that numerous other applications are possible. For example, the invention will find equal application to the production of composite grids for other types of batteries such as alkaline storage batteries. Furthermore, the teachings of the invention may be applied to the production of other articles of manufacture wherever it is desired to join two materials at a single molding station. Preferably, the first material injected will be of a relatively higher melting point followed by injection of the second material having a lower melting point. However, those skilled in the art will appreciate that such a limitation is not absolutely necessary. The materials may vary from two metals, a metal and a plastic, two plastic materials, or other moldable materials. Those skilled in the art will appreciate that the temperatures and pressures of the injected materials may be varied depending upon the materials and the shape of the article to be molded. Furthermore, the time required to permit solidification of the materials in the molds will also vary depending upon the external environment conditions, whether or not artificial cooling is provided to the mold, and the shape and design of the mold pattern and molds themselves.

Further, while particular embodiments of the present invention are shown and described above, it will be understood, of course, that the invention is not to be limited thereto, since many modifications may be made, but is to be taken solely from an interpretation of the claims which follow.

For example, the retractable pins 40 and 140 could each be replaced by movable pins which move from first, retracted positions to second, extended positions when plastic is being injected, in order to push the molded disc-shaped portions 25 and 125, respectively, at least partially out of finger-defining portions 37 and 137 and into second mold patterns 52 and 152, respectively. Thus, voids are formed around the outside walls of the disc-shaped portions 25 and 125, into which the plastic can flow and engage the conductive members 14 and 114, respectively, along the exterior of the fingers 24 and 124, respectively. The retractable pins 40 and 140 could also each be replaced by retractable pins which are so constructed as to abut the outside wall of the conductive runners 24 and 124, respectively, when in their first, extended positions, and to create voids along such walls, when in their second, retracted positions, so that plastic can flow into such voids and engage the conductive members 14 and 114, respectively, along the exterior of the conductive runners 24 and 124, respectively.

Similarly both the pins 140 and 148 can be replaced by a single retractable pin which is so constructed as to have a narrow portion and a broad portion, with the narrow portion extending into a runner groove 137 and the broad portion being positioned in the second mold pattern 152 and serving to prevent the entry of lead into the second mold pattern 152, when such pin is in its first, extended position and which is retracted into the mold half 145 so as to create voids in the first pattern 135 and to permit plastic to flow into such voids and to thereby engage the conductive member 114.

In short, the particular number, configuration or combination of movable pins and the manner and direction in which they are moved can be varied greatly and still serve the function of the movable pins in making the integrally formed plastic support grids and the integrally formed conductive members of this invention as described hereinabove.

Further, the rods 225 can have a wide variety of shapes other than that of a cylindrical rod and can extend laterally from the lead runners 224 at any angle necessary to permit effective engagement of the conductive member 214 and supporting grid 212.

It is contemplated, therefore, by the appended claims, to cover any such modifications as fall within the true spirit and scope of this invention.

What is claimed is:

1. The method of forming a composite battery grid having an electrically conductive member and a plastic support, said conductive member comprising a terminal lug having a plurality of divergent conductive runners extending therefrom and said plastic support comprising a generally rectangular boundary within which is a plurality of interconnected spaced runners forming a grid-like structure, comprising the steps of:

providing a first mold half having a pattern formed therein, said first mold half including retractable means placed within one or more portions of said pattern, said retractable means being movable between an extended position and a retracted position, said pattern being in the shape of at least part of a first structure, said first structure being one of said conductive member and said plastic support;

providing a second mold half having a pattern formed therein, said pattern being in the shape of the remainder of said first structure;

placing said first and second mold halves together with said retractable means in an extended position;

introducing a first material in a liquid state into said first and second mold half patterns and allowing said first material to at least partially solidify and form said first structure, said first material being metal if said first structure is said conductive member and being plastic if said first structure is said plastic support;

removing said second mold half while retaining said first material in said first mold half;

placing a third mold half adjacent said first mold half, said third mold half having a pattern which overlies portions of said first mold half pattern including said retractable means, said third mold half pattern being in the shape of a second structure, said second structure being the other of said conductive member and said plastic support;

moving said retractable means to a retracted position to form vacated portions in said first mold half pattern and in communication with said third mold half pattern;

injecting a second flowable material into said third mold half pattern to cause said second material to liquify and flow into said vacated portions to form a mechanical joint between said first and second materials, said second material being plastic if said second structure is said plastic support and being metal if said second structure is said conductive material;

allowing said second material to solidify and form said second structure; and removing the resulting molded battery grid from said first and third mold halves.

2. The method as set forth in claim 1 wherein said first structure is said conductive member and said second structure is said plastic support.

3. The method as set forth in claim 2 wherein said first material is injected under pressure into said first and second mold half patterns.

4. The method as defined in claim 3 wherein said first material is an alloy of lead.

5. The method as set forth in claim 1 wherein said first material has a higher melting point than said second material.

6. The method as set forth in claim 1 wherein said retractable means are moved to said retracted position prior to injection of said second material.

7. The method as set forth in claim 1 wherein said retractable means are moved to said retracted position during injection of said second material.

8. The method as set forth in claim 1 wherein said first material is injected under pressure into said first and second mold half patterns.

9. The method as set forth in claim 8 wherein said retractable means are moved to said retracted position during injection of said second material.

10. The method as set forth in claim 1 wherein said first material is fed by gravity into said first and second mold half patterns.

11. The method as defined in claim 1 wherein said first material is an alloy of lead.

12. The method as set forth in claim 11 wherein said retractable means are moved to said retracted position prior to injection of said second material.

13. A composite battery grid made according to the method set forth in claim 1.

14. A composite battery grid comprising:

a plastic support having a grid-like structure;

an electrically conductive member comprising a lug having a plurality of interconnected fingers said support being mechanically interlocked with said conductive member by a plurality of joints at which a portion of said plastic has been caused to flow through openings formed in said conductive member.

15. The battery grid as set forth in claim 14 wherein said plastic is selected from the group consisting of polypropylene, polyethylene, polycarbonate and polystyrene.

16. The battery grid as set forth in claim 14 wherein said conductive member is formed from an alloy of lead.

17. A method of forming a composite battery grid having an electrically conductive member and a plastic support, said conductive member comprising a terminal lug having a plurality of divergent conductive runners extending therefrom and said plastic support comprising a generally rectangular boundary within which is a plurality of interconnected spaced runners forming a grid-like structure, comprising the steps of:
providing a first mold half having a pattern formed therein and including movable means which are movable between a first position and a second position and which are in communication with at least one portion of said pattern when in said first position, said pattern being in the shape of a first structure, said first structure being one of said conductive member and said plastic support;
providing a second mold half;
placing said first and second mold halves together with said movable means in said first position;
introducing a first material in a liquid state into said first mold half pattern and allowing said first material to at least partially solidify and form said first structure, said first material being metal if said first structure is said conductive member and being plastic if said first structure is said plastic support;
removing said second mold half while retaining said first material in said first mold half pattern;
placing a third mold half adjacent said first mold half, said third mold half having a pattern which overlies portions of said first mold half pattern including said movable means, said third mold half pattern being in the shape of a second structure, said second structure being the other of said conductive member and said plastic support;
moving said movable means to said second position to form at least one vacated portion in communication with said first and third mold half patterns;
injecting a second flowable material into said third mold half pattern to cause said second material to liquify and flow into at least one said vacated portion, where, upon solidifying, said second material engages said first material, said second material being plastic if said second structure is said plastic support and being metal if said second structure is said conductive member;
allowing said second material to solidify and form said second structure; and
removing the resulting molded battery grid from said first and third mold halves.

18. The method of claim 17 wherein said movable means are retractable means which are movable between an extended position as said first position and a retracted position as said second position.

19. The method of claim 18 wherein said retractable means are located within at least one portion of said first mold half pattern and wherein said retractable means are moved to a retracted position to form at least one vacated portion in said first mold half pattern.

20. The method of claim 19 wherein said second material flows into at least one said vacated portion where, upon solidifying, an interlocking mechanical joint is formed between said first and second materials.

21. The method of claim 20 wherein said second mold half has a pattern formed therein and said first material is introduced into said first and second mold half patterns.

22. A method of forming a composite article comprising the steps of:
providing two mold halves having first and second patterns formed therein, with at least one of said first and second patterns being in one of said mold halves, and said mold halves including at least one type of movable means, with each said type of movable means being movable between a first position and a second position and at least one said type of movable means being in one of said mold halves;
placing said two mold halves together so that one of said patterns overlies at least one portion of the other of said patterns, with each said type of movable means being in its first position and being in communication with said first pattern, and with at least one said type of movable means separating said first pattern from said second pattern everywhere one of said patterns overlies the other of said patterns;
introducing a first material in a liquid state into said first pattern, with said type of said movable means which separate said first and second patterns preventing entry of said first material into said second pattern and allowing said first material to at least partially solidify;
moving each said type of movable means to its second position to form at least one vacated portion in communication with said first and second patterns and to remove the separation between said first and second patterns where one of said patterns overlies the other of said patterns;
injecting a second flowable material into said second pattern to cause said second material to liquify and flow into at least one said vacated portion, where, upon solidifying, said second material engages said first material;
allowing said second material to solidify; and
removing the resulting molded article from said mold halves.

23. The method of claim 22 wherein said first pattern is in one mold half and said second pattern is in the other mold half.

24. The method of claim 23 wherein there are two said types of movable means, one of which is located in each mold half.

25. The method of claim 24 wherein said type of movable means in said mold half containing said first pattern is retractable means which are movable between an extended position as their first position and a retracted position as their second position, which are located within at least one portion of said first pattern, and which are moved to a retracted position to form at least one vacated portion in said first pattern; and wherein said type of movable means in said mold half containing said second pattern is means which are movable between an extended position as their first position and a retracted position as their second position and which in their extended position separate said first pattern from said second pattern everywhere one of said patterns overlies the other of said patterns and prevent entry of said first material into said second pattern.

26. A method of forming a composite article comprising the steps of:
   providing a first mold half having a portion of a first pattern formed therein;
   providing a second mold half having the remaining portion of said first pattern formed therein;
   placing said first and second mold halves together in such a manner that said portions of said first pattern in said first and second mold halves are in communication with each other;
   introducing a first material in a liquid state into said first pattern and allowing said first material to at least partially solidify therein;
   removing said second mold half while retaining said first material in said portion of said first pattern in said first mold half;
   placing a third mold half adjacent said first mold half, said third mold half having a second pattern formed therein into which extends a portion of said first material which at least partially solidified in said portion of said first pattern in said second mold half;
   injecting a second flowable material into said second pattern to cause said second material to flow around said portion of said first material extending thereinto, where, upon solidifying, said second material engages said first material;
   allowing said second material to solidify; and
   removing the resulting molded article from said first and third mold halves.

27. The method of claim 26 wherein said first material is a metal and is injected under pressure into said first pattern and said second material is a plastic.

28. The method of claim 27 wherein said article is a battery grid and said first material is an alloy of lead.

29. The method of claim 26 wherein said first material has a higher melting point than said second material.

30. The method of claim 26 wherein said first material is fed by gravity into said first pattern.

31. A composite battery grid comprising:
   an injecting molded electrically conductive member; and
   a molded support formed by injection molding plastic and comprising a structure overlying said conductive member and mechanically engaging said conductive member at only selected regions of said conductive member where said support overlies said conductive member and plastic has been caused to flow during injection molding of said support and, upon solidification thereof engages said conductive member.

32. The composite battery grid of claim 31 wherein said conductive member comprises a lug having a plurality of interconnected fingers and said support has a grid-like structure.

33. The composite battery grid of claim 31 wherein said conductive member has openings formed therein during injection molding thereof and wherein a portion of said plastic has been caused to flow during injection molding thereof through said openings to form, upon solidification thereof, an interlocking joint with said conductive member.

34. The composite battery grid of claim 31 wherein said plastic is selected from the group consisting of polypropylene, polyethylene, polycarbonate and polystyrene.

35. The composite battery grid of claim 31 wherein said conductive member is formed from an alloy of lead.

36. A composite battery grid comprising:
   an injection molded electrically conductive member having openings formed therein during injection molding thereof; and
   a molded support formed by injection molding plastic, said support mechanically engaging said conductive member by interlocking joints at said openings through which a portion of said plastic has been caused to flow during injection molding of said support and to form, upon solidification thereof, interlocking joints with said conductive member.

* * * * *